W. DOSCHER.
SUGAR-CUTTING MACHINE.

No. 173,918. Patented Feb. 22, 1876.

Inventor.
Wilhelm Doscher
per
Van Santvoord & Hauff
Attorneys

Witnesses.
Otto Hufeland
Chas Wahlers

UNITED STATES PATENT OFFICE.

WILHELM DOSCHER, OF JERSEY CITY, NEW JERSEY.

IMPROVEMENT IN SUGAR-CUTTING MACHINES.

Specification forming part of Letters Patent No. 173,918, dated February 22, 1876; application filed January 21, 1876.

*To all whom it may concern:*

Be it known that I, WILHELM DOSCHER, of Jersey City, county of Hudson and State of New Jersey, have invented a new and useful Improvement in Machines for Cutting Sugar, which improvement is fully set forth in the following specification, reference being had to the accompanying drawing, in which—

Figure 1:
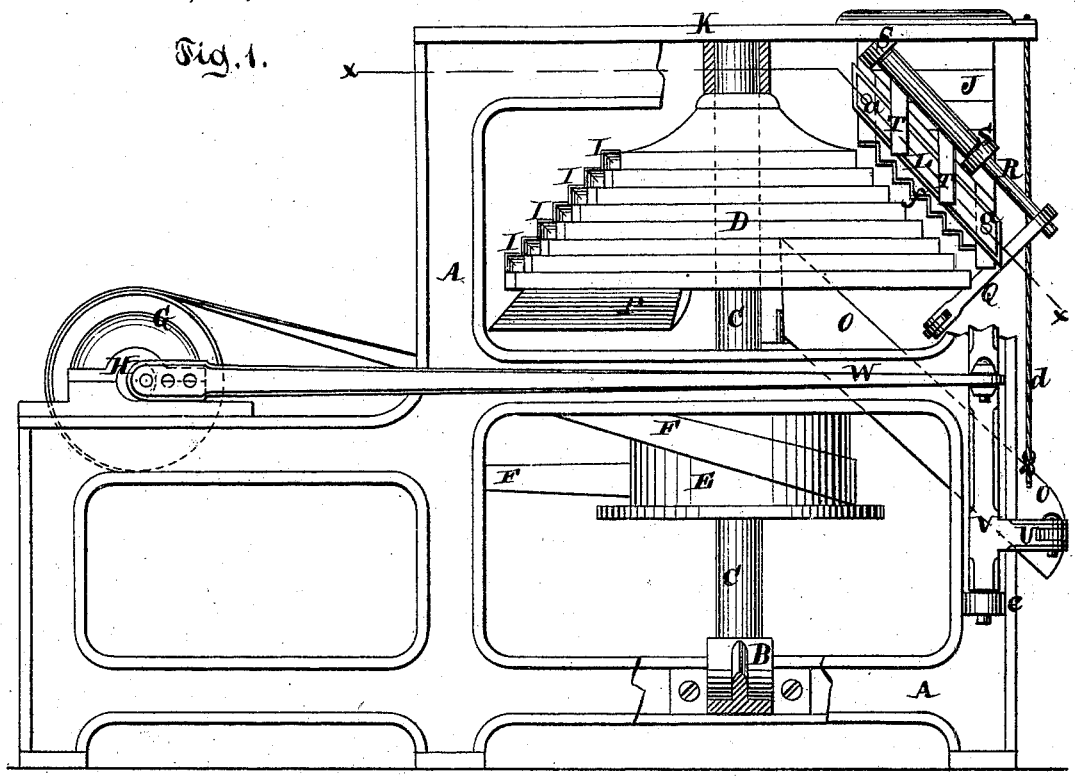
Figure 2:
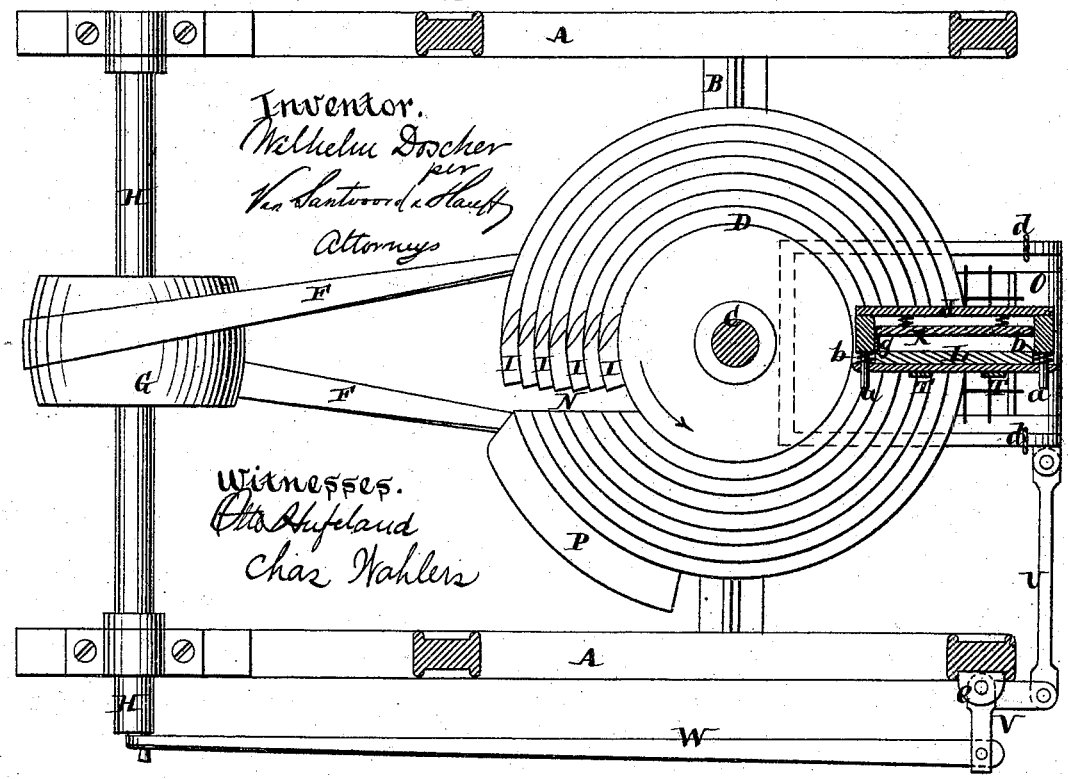

Figure 1 represents a side elevation of my improvement, partly in section. Fig. 2 is a horizontal section in the plane $x\,x$, Fig. 1.

Similar letters indicate corresponding parts.

My invention relates to certain improvements in machines for cutting sugar into blocks or cubes, and consists in the combination of a series of rotating knives with a feed-box and an intermittingly-acting clamp, the knives being arranged to pass beneath the lower and open end of the feed-box, while the clamp is arranged in one of the sides of the box in such a manner as to hug the latter during the time the knives pass beneath it; and hence if sugar, in the form of a flat cake, is placed in the feed-box and allowed to protrude from the lower end of the box, a portion of the cake is cut off in the form of blocks or cubes, (the knives being shaped accordingly), while the whole is firmly held during the process of cutting.

The rotating knives are attached to the surface of a cone, which is mounted on a spindle in the frame of the machine, and which constitutes a support for the cake of sugar protruding from the end of the feed-box, while it serves to regulate the distance to which such cake is allowed to protrude, so that blocks or cubes of uniform size are obtained.

After the sugar has been cut into blocks or cubes it falls through an opening in the cone on a separator, to which a shaking motion is imparted by any suitable mechanism, so that if the blocks adhere to each other they are effectually separated.

In the drawing, the letter A designates the frame of my machine, in a cross-piece, B, of which is stepped a vertical spindle, C. On this spindle is mounted a cone, D, and a pulley, E, which latter connects by a belt, F, with a driving-pulley, G, mounted on a horizontal shaft, H, so that when this shaft is rotated a like motion is imparted to the spindle C and the cone. To the cone D are attached a series of knives, I, which are placed in a line on the surface thereof, as shown, the cone being stepped and the knives being arranged on the steps. The cutting-edges of the knives I are bent at right angles, as seen in Fig. 1, so that the whole series of knives form a stair-shaped or zigzag projection on the face of the cone. If seen fit, the knives I may be supported by other means than the cone D, so as to partake of the motion of the spindle C, the object of the cone being chiefly to form a support for the cake of sugar to be cut, as hereinafter explained. Contiguous to the cone D is situated the lower end of a feed-box, J, which occupies a vertical position and is fastened to a plate, K, forming part of the machine-frame, this plate being provided with a suitable opening to form an entrance to the box. In one of the sides of the feed-box J is arranged a clamp, L, which moves horizontally on pins $a\,a$, and which is connected with mechanism for moving it intermittingly toward the feed-box, the clamp being subjected to the action of springs $b\,b$, Fig. 2, which have a tendency to move it outward, and by which it is so moved when released from the action of the mechanism last mentioned. The springs $b\,b$ are composed of wire, which is coiled on the pins $a\,a$.

The lower end of the feed-box J is open, while it, together with the lower end of the intermittingly-acting clamp L, is made oblique, and may be stepped so as to correspond with the shape of the cone D; and if a flat cake of sugar is placed in the feed-box J and allowed to fall by its inherent gravity so as to protrude from the lower and open end of the box, the cake rests on the surface of the cone D, while if the knives I are hereupon rotated they cut from the cake, if the edge is straight, first a series of triangular blocks; then, the edge of the cake being stepped, and the cake being allowed again to fall, a series of perfect cubes, and so on till the entire cake is used up.

The motion of the clamp L is so regulated that it moves toward or hugs the feed-box during or immediately preceding the time the knives I pass thereunder in the rotation of the cone D, and when the cutting takes place;

hence, the cake of sugar contained in the box is tightly held, and prevented from moving either up or down during the process of cutting. By making the lower end of the feed-box and the clamp L so as to extend contiguous to the surface of the cone D, a firm lateral support is obtained for the cake of sugar placed in the box during the process of cutting.

As before stated, the cake of sugar, when allowed to fall and protrude from the lower end of the feed-box J, is caught and rests on the cone D, and by this arrangement the distance to which the cake is allowed to protrude or fall is regulated, and blocks or cubes of uniform size are obtained.

The cone D is provided with an opening, N, Fig. 2, on one of the edges of which the knives I are placed, and beneath the cone is situated a sieve or separator, O, which is suspended by cords $d\ d$ from the top plate K of the machine-frame. This separator O, moreover, rests loosely on a cross-piece of the machine-frame, while it is connected with mechanism for imparting thereto a shaking motion. The blocks or cubes cut from the cake of sugar protruding from the lower end of the feed-box J by the knives I fall through the opening N on the separator O, and if some of the blocks adhere to each other they are readily separated by the shaking motion of the latter.

The means which I have in this example employed for giving an intermittent motion to the clamp L consists of a cam, P, forming part of the cone D, and a lever, Q, which is secured to a rock-shaft, R, mounted in lugs S S on the side of the feed-box J, in which is arranged the clamp L. The rock-shaft R carries flaps T T, which extend in front of the clamp L in such a manner that when the cone D is rotated the cam P actuates the lever Q and the rock-shaft, whereby the flaps T T are brought to bear and held in contact with the clamp L, and the latter is moved inward. The cam P is placed at such a part of the cone D that the clamp is held during or immediately preceding the time the knives cut.

A shaking motion is imparted to the separator O by means of a bar, U, which serves to connect it to one arm of a bell-crank, V, the other arm of which is connected to a rod, W, which, in turn, is connected eccentrically to the driving-shaft H, in such a manner that the bell-crank V is vibrated when the shaft H is rotated, while, by the bar U, the separator is shaken. The bell-crank V is mounted horizontally in lugs $e$ secured to the machine-frame.

It is obvious that the series of knives I may be duplicated, and in such case I duplicate also the cam P and its concomitant parts, so that the clamp L is actuated as often as the sugar is cut.

To the lower edge of the feed-box J may be affixed a metallic blade, $f$, Fig. 1, which acts in conjunction with the knives I for the purpose of cutting the sugar. Within the feed-box, moreover, may be placed a spring, X, Fig. 2, for the purpose of offering an elastic resistance to the cake of sugar when compressed by the clamp L, and a flat spring, $g$, which has a tendency to press the cake outward, and thereby hold it in a proper position relatively to the cone D—that is to say, so that the steps formed on the lower edge of the cake in the process of cutting adapt themselves to the steps formed on the surface of the cone.

It may be remarked that the surface of the cone D can be made plain without departure from my invention.

What I claim as new, and desire to secure by Letters Patent, is—

1. In a machine for cutting sugar into blocks or cubes, the combination of a series of rotating knives, I, with a feed-box, J, and an intermittingly-acting clamp, L, the whole being adapted to operate substantially as described.

2. A rotating cone, D, carrying the knives I, and forming a support for the cake of sugar to be cut, in combination with the knives I and the intermittingly-acting clamp L, substantially as described.

3. In combination with a series of rotating knives, I, the intermittingly-acting clamp L and cone D, having an opening, N, I claim the separator O, substantially as described.

In testimony that I claim the foregoing I have hereunto set my hand and seal this 14th day of January, 1876.

WILHELM DOSCHER. [L. S.]

Witnesses:
 GEORGE T. MAHLAND,
 W. HAUFF.